United States Patent
Deleeuw

(10) Patent No.: US 9,679,575 B2
(45) Date of Patent: Jun. 13, 2017

(54) REPRODUCE A VOICE FOR A SPEAKER BASED ON VOCAL TRACT SENSING USING ULTRA WIDE BAND RADAR

(75) Inventor: William C. Deleeuw, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 472 days.

(21) Appl. No.: 13/976,009

(22) PCT Filed: Dec. 22, 2011

(86) PCT No.: PCT/US2011/066908
§ 371 (c)(1),
(2), (4) Date: Dec. 2, 2013

(87) PCT Pub. No.: WO2013/095524
PCT Pub. Date: Jun. 27, 2013

(65) Prior Publication Data
US 2014/0081628 A1     Mar. 20, 2014

(51) Int. Cl.
| | | |
|---|---|---|
| G10L 21/00 | (2013.01) |
| G10L 19/02 | (2013.01) |
| G10L 15/24 | (2013.01) |
| G10L 25/75 | (2013.01) |
| G10L 13/02 | (2013.01) |
| H04B 1/66 | (2006.01) |
| G10L 25/93 | (2013.01) |
| G10L 13/04 | (2013.01) |
| G10L 25/90 | (2013.01) |

(52) U.S. Cl.
CPC ............. G10L 19/02 (2013.01); G10L 13/02 (2013.01); G10L 15/24 (2013.01); G10L 25/75 (2013.01); H05K 999/99 (2013.01); G10L 13/04 (2013.01); G10L 25/90 (2013.01); G10L 25/93 (2013.01); H04B 1/667 (2013.01)

(58) Field of Classification Search
CPC ...... H05K 999/99; H04B 1/167; H04B 1/667; G10L 19/02; G10L 19/10; G10L 19/12; G10L 19/173; G10L 25/15; G10L 25/90; G10L 25/93; G10L 25/78; G10L 13/07; G10L 13/04
USPC ....... 704/203, 205, 208, 214, 221, 258, 261, 704/270, 206, 207, 209, 216
See application file for complete search history.

(56) References Cited

U.S. PATENT DOCUMENTS 5,826,221 A    10/1998   Aoyagi
6,006,175 A    12/1999   Holzrichter

FOREIGN PATENT DOCUMENTS

WO    2006075179 A1    7/2006

OTHER PUBLICATIONS

International Search Report and Written Opinion, Mailed Date: Sep. 25, 2012, Application No. PCT/US2011/066908, Filed Date: Dec. 22, 2011, pp. 10.

Primary Examiner — Vu B Hang

(57) ABSTRACT

Examples are disclosed for reproducing a voice for a speaker based on vocal tract sensing using ultra wide band (UWB) radar. These examples may include sensing a vocal tract of the speaker during non-sounded speech communication and mapping information associated with the sensed vocal tract to a voice model to generate a simulation of the vocal tract during sounded speech communication. The examples may also include reproducing a voice for the speaker based on the simulation.

25 Claims, 10 Drawing Sheets

Voice Model 700

| Vocal Tract Organ | Position at Sound 1 | Position at Sound 2 | Position at Sound 3 | *** | Position at Sound n |
|---|---|---|---|---|---|
| Velum | 715-1 | 715-2 | 715-3 | *** | 715-n |
| Uvula | 720-1 | 720-2 | 720-3 | *** | 720-n |
| Pharynx | 723-1 | 723-2 | 723-3 | *** | 723-n |
| Epiglottis | 725-1 | 725-2 | 725-3 | *** | 725-n |
| Larynx | 730-1 | 730-2 | 730-3 | *** | 730-n |
| Glottis | 735-1 | 735-2 | 735-3 | *** | 735-n |
| Vocal Cord Folds | 740-1 | 740-2 | 740-3 | *** | 740-n |
| Tongue | 745-1 | 745-2 | 745-3 | *** | 745-n |
| Teeth | 750-1 | 750-2 | 750-3 | *** | 750-n |
| Lips | 755-1 | 755-2 | 755-3 | *** | 755-n |
| Nasal Cavity | 760-1 | 760-2 | 760-3 | *** | 760-n |
| Sound Mem. Addr. | 790-1 | 790-2 | 790-3 | *** | 790-n |

FIG. 7

Vocal Tract Table 800

| Vocal Tract Organ | Positions at Time 1 | Position at Time 2 | Position at Time 3 | *** | Position at Time n |
|---|---|---|---|---|---|
| Velum | 815-1 | 815-2 | 815-3 | *** | 815-n |
| Uvula | 820-1 | 820-2 | 820-3 | *** | 820-n |
| Pharynx | 823-1 | 823-2 | 823-3 | *** | 823-n |
| Epiglottis | 825-1 | 825-2 | 825-3 | *** | 825-n |
| Larynx | 830-1 | 830-2 | 830-3 | *** | 830-n |
| Glottis | 835-1 | 835-2 | 835-3 | *** | 835-n |
| Vocal Cord Folds | 840-1 | 840-2 | 840-3 | *** | 840-n |
| Tongue | 845-1 | 845-2 | 845-3 | *** | 845-n |
| Teeth | 850-1 | 850-2 | 850-3 | *** | 850-n |
| Lips | 855-1 | 855-2 | 855-3 | *** | 855-n |
| Nasal Cavity | 860-1 | 860-2 | 860-3 | *** | 860-n |

FIG. 8

REPRODUCE A VOICE FOR A SPEAKER BASED ON VOCAL TRACT SENSING USING ULTRA WIDE BAND RADAR

BACKGROUND

The number of users of wireless communication devices has seen a tremendous amount of growth over the last two decades. A common sight is a speaker maintaining a conversation on a wireless communication device in a public setting. Often an anonymous person may be just a few feet away from the speaker and can overhear what could be private details of the speaker's conversation. The speaker may sometimes accept the possibility of exposing private details during the conversation due to their possible anonymity to those around them. Regardless of anonymity, others may not want to overhear the conversation. Also, should the speaker desire privacy, background noise may make it difficult to maintain a conversation and still keep their voice to a sound level that won't be overheard by and/or irritate others. Further, background noise may also degrade the quality of a conversation with a person on the other end of the conversation.

BRIEF DESCRIPTION OF THE DRAWINGS

FIG. 7 illustrates an example voice model.

FIG. 8 illustrates an example vocal tract model.

DETAILED DESCRIPTION

As contemplated in the present disclosure, people around a speaker using a wireless communication device and/or the speaker may want to maintain a conversion in a public and possibly noisy environment without being overheard or having a lower quality conversation. Current wireless communication devices (e.g., cellular phone or smart phone) require vocalization or sounded speech communication in order to maintain a verbal conversation with a person on the other end of a communication link. However, sounded speech communication may be problematic to maintaining privacy in a public and/or noisy environment.

In some examples, techniques are implemented for reproducing a voice for a speaker. For these examples, a vocal tract of a speaker may be sensed during non-sounded speech communication (e.g., words are mouthed). The vocal tract may be sensed using an ultra wide band (UWB) radar system coupled to a wireless communication device. Information associated with the sensed vocal tract may be mapped to a voice model to generate a simulation of the vocal tract during sounded speech communication. Components of a voice for the speaker may be generated based on the simulation to enable the voice to be reproduced in near real-time via a voice encoder (vocoder).

Figure 1:
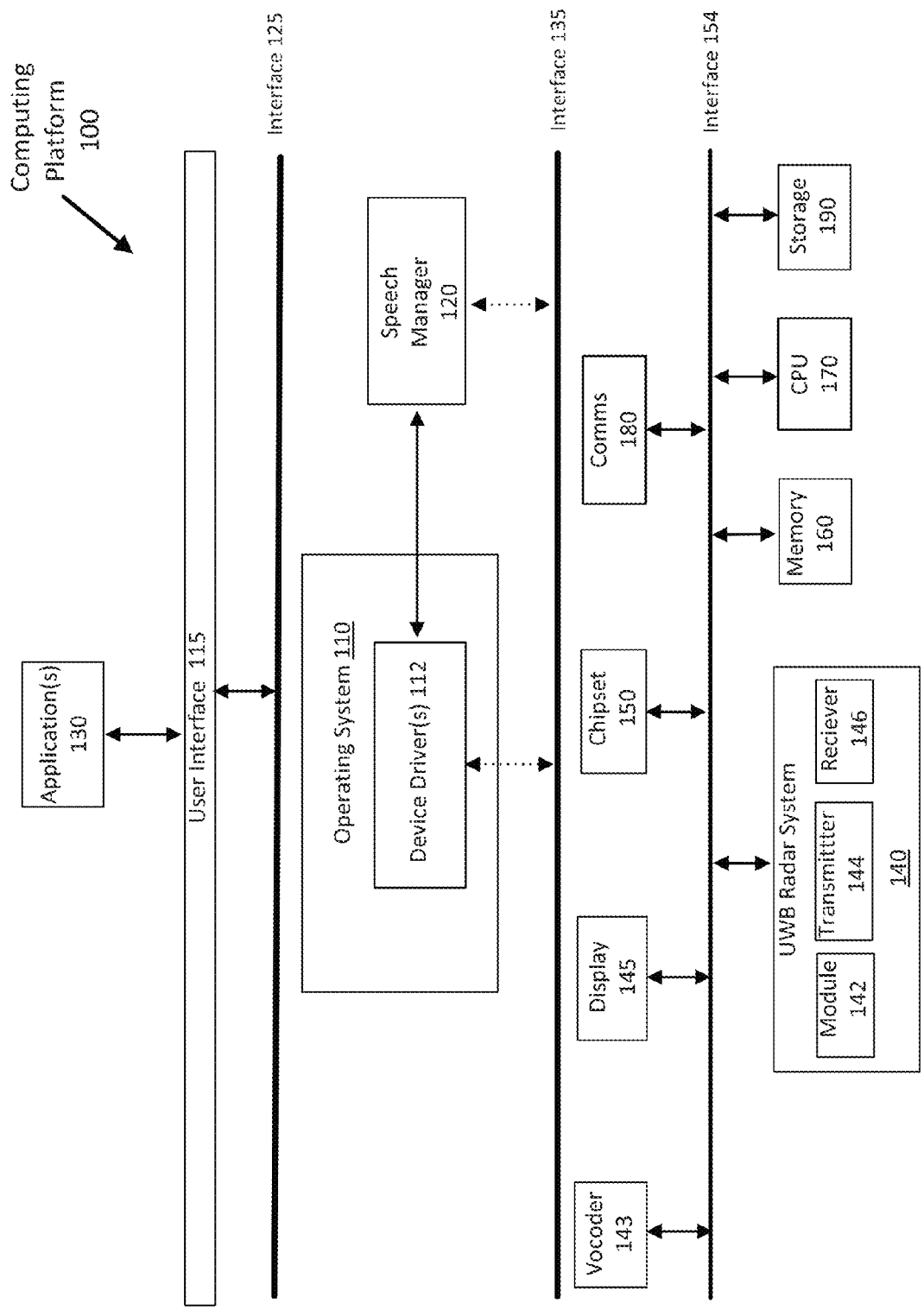
FIG. 1 illustrates an example computing platform.

FIG. 1 illustrates an example computing platform 100. As shown in FIG. 1, computing platform 100 includes an operating system 110, a speech manager 120, application(s) 130, ultra wide band (UWB) radar system 140, a voice encoder (vocoder) 143, a display 145, a chipset 150, a memory 160, a central processing unit (CPU) 170, a communications (comms) 180 and storage 190. According to some examples, several interfaces are also depicted in FIG. 1 for interconnecting and/or communicatively coupling elements of computing platform 100. For example, user interface 115 and interface 125 may allow for users (not shown) and/or application(s) 130 to couple to operating system 110. Also, interface 135 may allow for speech manager 120 or elements of operating system 110 (e.g., device driver(s) 112) to communicatively couple to elements of computing platform 100 such as UWB radar system 140, display 145, memory 160, CPU 170 or comms 180. Interface 154, for example, may allow hardware and/or firmware elements of computing platform 100 to communicatively couple together, e.g., via a system bus or other type of internal communication channel.

In some examples, application(s) 130 may include applications that may include, but are not limited to, applications for creating voice models (e.g., associated with a speaker or a synthetic speaker), applications for assisting with creation of voice models or applications for using information associated with sensed voice tracts to assist with simulated sounded speech communication and subsequent reproductions of a voice for the speaker. Application 130 may also assist speech manager 120 in generating at least components of a voice for a speaker based on use of UWB radar system 140 to sense a vocal tract of the speaker during non-sounded speech communication.

According to some examples, as shown in FIG. 1, operating system 110 may include device driver(s) 112. Device driver(s) 112 may include logic and/or features configured to interact with hardware/firmware type elements of computing platform 100 (e.g., via interface 135). For example, device driver(s) 112 may include device drivers to control or direct UWB radar system 140. Device driver(s) 112 may also interact with speech manager 120 to use UWB radar system 140 to sense a vocal tract of a speaker during non-sounded speech. This interaction may include speech manager 120 causing UWB radar system 140 to transmit UWB signals toward vocal organs included in the vocal tract of the speaker and also causing the UWB radar system to detect reflected signals in order to sense the vocal tract.

As shown in FIG. 1, UWB radar system 140 includes module 142, transmitter 144 and receiver 146. In some examples, module 142 may generate UWB signal pulses (e.g., within a 3 gigahertz (GHz) to 10 GHz band) to be transmitted via transmitter 144. For these examples, as mentioned above, the UWB signal pulses may be transmitted toward vocal organs for a vocal tract of a speaker. As described more below, receiver 146 may capture UWB signals reflected from the vocal organs. Speech manager 120, for example, may include logic and/or features configured to use the captured reflected UWB signals to sense the vocal tract of the speaker, map information associated with the sensed vocal tract to a voice model to simulate the a voice for the speaker and then generate at least components of the voice based on the simulation of the speaker's voice.

In some examples, as shown in FIG. 1, computing platform 100 may include a vocoder 143. For these examples, at least components of a voice of a speaker (e.g., utterances) may be used to digitally reproduce a voice for the speaker. Speech manager 120, for example, may provide the generated speech components to vocoder 143 to enable reproduction of the voice. As mentioned above and described more below, the speech components may be reproduced based on sensing the speaker's vocal tract using UWB radar system 140 and mapping the information associated with the sensed vocal tract to a voice model.

In some examples, chipset 150 may provide intercommunication among operating system 110, UWB radar system 140, display 145, memory 160, CPU 170, comms 180 or storage 190.

According to some examples, memory 160 may be implemented as a volatile memory device utilized by various elements of computing platform 100 (e.g., as off-chip memory). For these implementations, memory 160 may include, but is not limited to, random access memory (RAM), dynamic random access memory (DRAM) or static RAM (SRAM).

According to some examples, CPU 170 may be implemented as a central processing unit for computing platform 100. CPU 170 may include one or more processing units having one or more processor cores or having any number of processors having any number of processor cores. CPU 170 may include any type of processing unit, such as, for example, a multi-processing unit, a reduced instruction set computer (RISC), a processor having a pipeline, a complex instruction set computer (CISC), digital signal processor (DSP), and so forth.

In some examples, comms 180 may include logic and/or features to enable computing platform 100 to communicate externally with elements remote to computing platform 100. These logic and/or features may include communicating over wired and/or wireless communication channels or connections via one or more wired or wireless networks. In communicating across such networks, comms 180 may operate in accordance with one or more applicable communication or networking standards in any version.

In some examples, storage 190 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device.

As mentioned above, interface 154, may allow hardware and/or firmware elements of computing platform 100 to communicatively couple together. According to some examples, communication channels interface 154 may operate in accordance with one or more protocols or standards. These protocols or standards may be described in one or one or more industry standards (including progenies and variants) such as those associated with the Inter-Integrated Circuit (I²C) specification, the System Management Bus (SMBus) specification, the Accelerated Graphics Port (AGP) specification, the Peripheral Component Interconnect Express (PCI Express) specification, the Universal Serial Bus (USB), specification or the Serial Advanced Technology Attachment (SATA) specification. Although this disclosure is not limited to only the above-mentioned standards and associated protocols.

Figure 2:
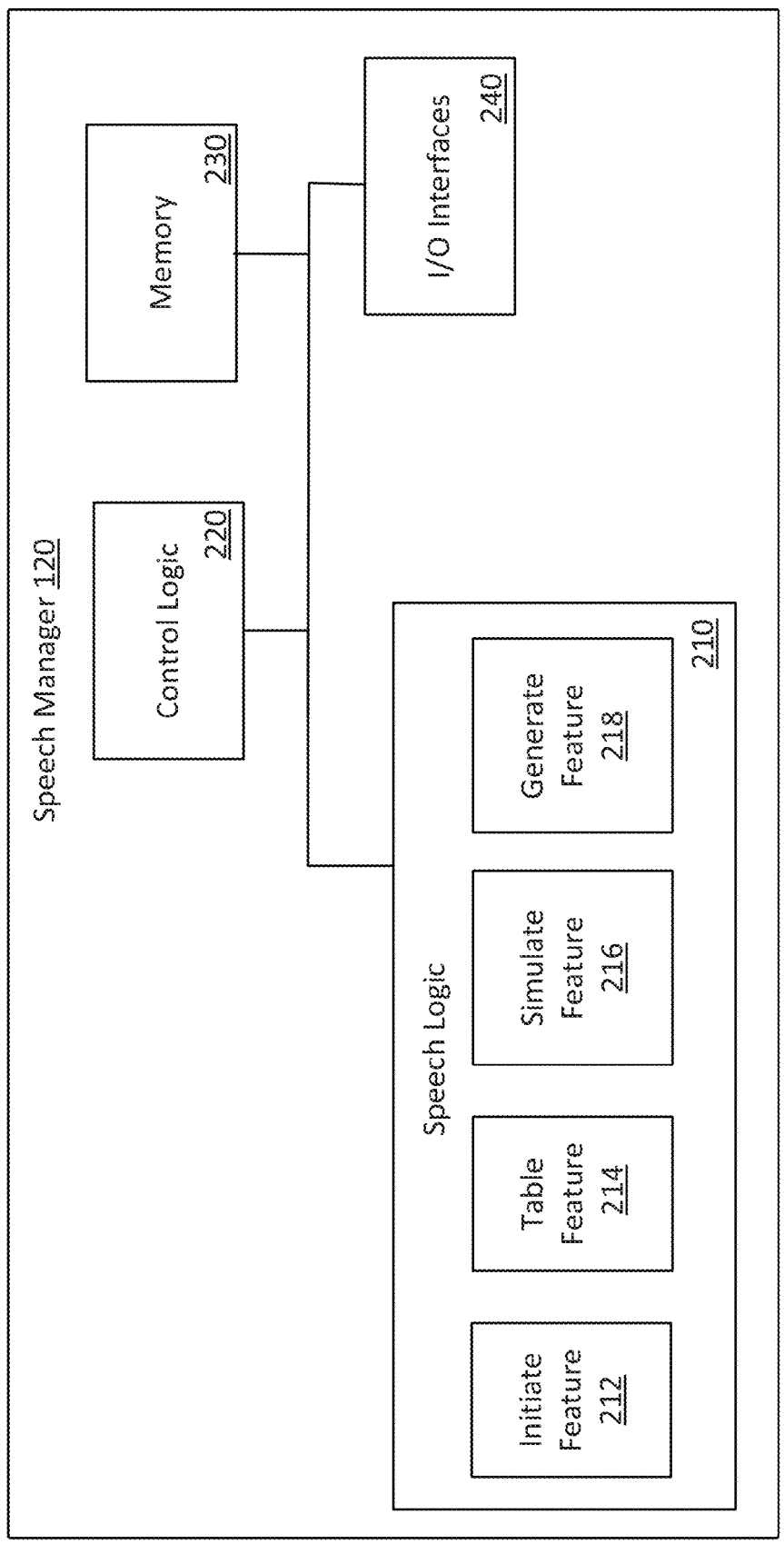
FIG. 2 illustrates a block diagram of an example architecture for a speech manager.

In some examples, computing platform 100 may be at least part of a wireless communication device. Examples of a wireless communication device may include a handheld computer, palmtop computer, personal digital assistant (PDA), cellular telephone, combination cellular telephone/PDA, smart device (e.g., smart phone or smart tablet), mobile internet device (MID), and so forth FIG. 2 illustrates a block diagram of an example architecture for speech manager 120. In some examples, speech manager 120 includes features and/or logic configured or arranged to use an UWB radar system (e.g., UWB radar system 140) to sense a vocal tract of a speaker. The vocal tract, for example, may be sensed during non-sounded speech communication, e.g., mouthed words with little to no perceptive sound. Speech manager 120 may also include features and/or logic configured or arranged to map information associated with the sensed vocal tract to a voice model to simulate the vocal tract and then generate at least components of a voice of for speaker based on the simulation of the vocal tract.

According to some examples, as shown in FIG. 2, speech manager 120 includes speech logic 210, control logic 220, a memory 230 and input/output (I/O) interfaces 240. As illustrated in FIG. 2, speech logic 210 may be coupled to control logic 220, memory 230 and I/O interfaces 240. Speech logic 210 may include one or more of an initiate feature 212, a model feature 214, a simulate feature 216, or a reproduce feature 218, or any reasonable combination thereof.

In some examples, the elements portrayed in FIG. 2 are configured to support or enable speech manager 120 as described in this disclosure. A given speech manager 120 may include some, all or more elements than those depicted in FIG. 2. For example, speech logic 210 and control logic 220 may separately or collectively represent a wide variety of logic device(s) or executable content to implement the features of speech manager 120. Example logic devices may include one or more of a microprocessor, a microcontroller, a processor circuit, a field programmable gate array (FPGA), an application specific integrated circuit (ASIC), a sequestered thread or a core of a multi-core/multi-threaded microprocessor or a combination thereof.

In some examples, as shown in FIG. 2, speech logic 210 includes initiate feature 212, model feature 214, simulate feature 216, or reproduce feature 218. Speech logic 210 may be configured to use one or more of these features to perform operations. For example, initiate feature 212 may determine whether a speaker desires to initiate a non-sounded speech communication and may also determine when the speaker desires to end a conversation. Table feature 214 may gather sense information associated with a vocal tract of the speaker that was sensed during the non-sounded speech communication. Simulate feature 216 may create a simulation of the vocal tract during sounded speech communication. The simulation may be based on a mapping of the modeled vocal tract to a voice model create at least in part during a modeling of the vocal tract during sounded speech communication. Generate feature 218 may then generate at least components of a voice for the speaker based on the simulation of the vocal tract and may provide the components to a vocoder to enable reproduction of the voice in near real-time.

In some examples, control logic 220 may be configured to control the overall operation of speech manager 120. As mentioned above, control logic 220 may represent any of a wide variety of logic device(s) or executable content. For some examples, control logic 220 may be configured to operate in conjunction with executable content or instructions to implement the control of speech manager 120. In some alternate examples, the features and functionality of control logic 220 may be implemented within speech logic 210.

According to some examples, memory 230 may be arranged to store executable content or instructions for use by control logic 220 and/or speech logic 210. The executable content or instructions may be used to implement or activate features or elements of speech manager 120. As described more below, memory 230 may also be arranged to at least temporarily maintain information associated with sensing a vocal tract and mapping that information associated with the sensed vocal tract to a voice model. Memory 230 may also be arranged to at least temporarily maintain information associated with simulating and reproducing a voice for a speaker.

Memory 230 may include a wide variety of memory media including, but not limited to, one or more of volatile memory, non-volatile memory, flash memory, programmable variables or states, RAM, ROM, or other static or dynamic storage media.

In some examples, I/O interfaces 240 may provide an interface via a local communication medium or link between speech manager 120 and elements of computing platform 100 depicted in FIG. 1. I/O interfaces 240 may include interfaces that operate according to various communication protocols to communicate over the local communication medium or link (e.g., $I^2C$, SMBus, AGP, PCI Express, USB, SATA, etc).

Figure 3:
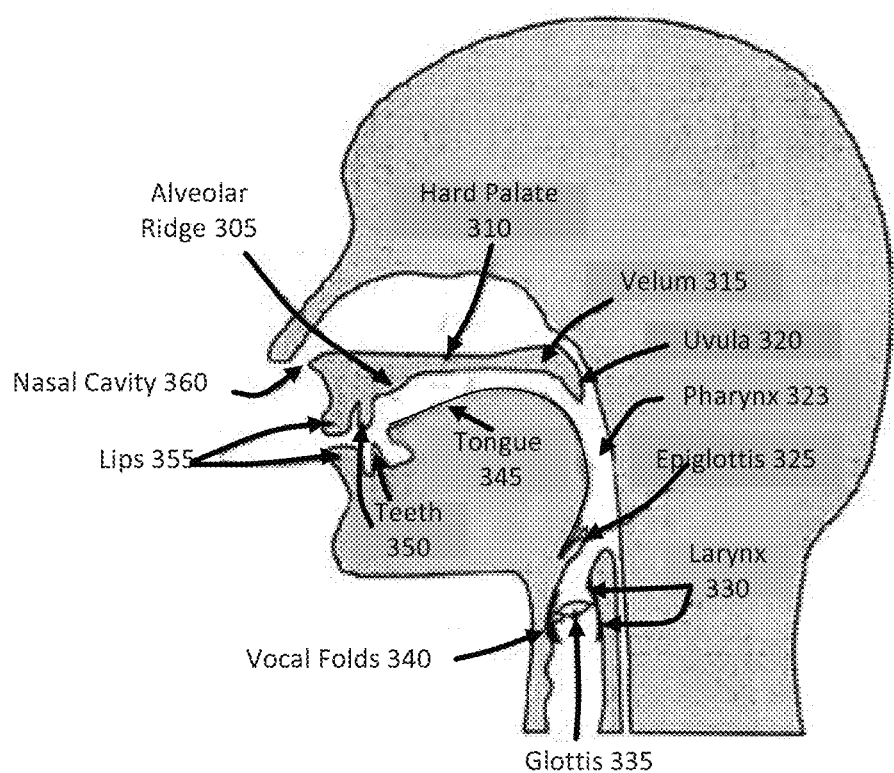
FIG. 3 illustrates a diagram of example vocal organs for a vocal tract.

FIG. 3 illustrates a diagram of example vocal organs included in a vocal tract 300. In some examples, as shown in FIG. 3, vocal tract 300 includes various human vocal organs, although this disclosure is not limited to the only the human vocal organs shown in FIG. 3. These various vocal organs are identified in FIG. 3 as an alveolar ridge 305, a hard palate 310, a velum 315, an uvula 320, a pharynx 323, an epiglottis 325, a larynx 330, a glottis 335, vocal folds 340, tongue 345, teeth 350, lips 355 and nasal cavity 360.

According to some examples, at least some vocal organs for vocal tract 300 may be in various physical orientations when a speaker uses either sounded or non-sounded speech communication. For example, lips 355, teeth 350 or tongue 345 may be in given physical orientations based on what words or utterances are being communicated by the speaker. The particular physical orientations may be substantially the same whether the speaker mouths the words (non-sounded) or speaks the work out loud (sounded).

Figure 4:
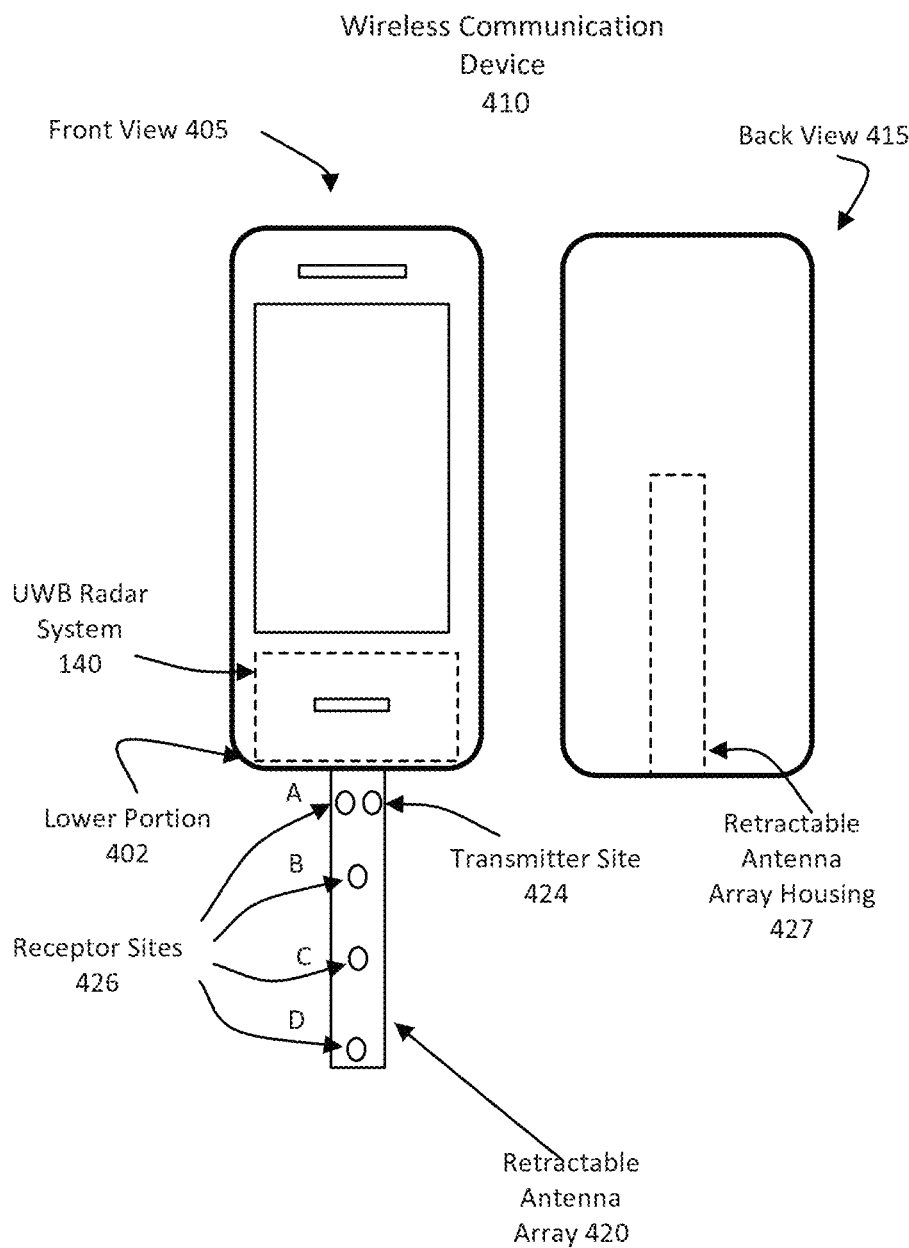
FIG. 4 illustrates an example wireless communication device including an UWB radar system.

FIG. 4 illustrates example wireless communication device 410 including UWB radar system 140. According to some examples, wireless communication device 410 may include at least some of the elements of computing platform 100. For these examples, as shown in front view 405, UWB radar system 140 (dotted box) may be located at or near a lower portion 402 of wireless communication device 410. Also as shown in FIG. 4, a retractable antenna array 420 may couple to lower portion 402 of wireless communication device 410.

In some examples, as shown in FIG. 4, retractable antenna array 420 may include transmitter site 424 and receptor sites 426A-D. For these examples, UWB pulses (e.g., generated by module 142) may be transmitted (e.g., via transmitter 144) from transmitter site 424 toward vocal organs in a vocal tract (e.g., vocal tract 300). Also, for these examples, reflected UWB pulses may be captured or sensed at spatially diverse receptor sites 426A-D (e.g., via receiver 146).

According to some examples, retractable antenna array 420 may fold back to or recess into wireless communication device 410. For these examples, as shown in FIG. 4, back view 415 includes a retractable antenna array housing 427. Although not shown in FIG. 4, retractable antenna array 420 may be coupled to lower portion 402 via a hinge. The hinge, for example, may allow a user of wireless communication device to extend retractable antenna array 420 when non-sounded speech communication is desired. The extension of retractable antenna array 420, for example, may position receptor sites 426A-D to better capture reflected UWB signals from one or more vocal organs of the user's vocal tract. Also, when sounded speech communication is desired, a user may fold retractable antenna array 420 so that it rests in retractable antenna array housing 427. In alternative examples, retractable antenna array 420 may slide into retractable antenna array housing 427 when not extended. For these alternative examples, retractable antenna array 420 may be slid out of retractable antenna array housing 427 when non-sounded speech communication is desired.

Figure 5:
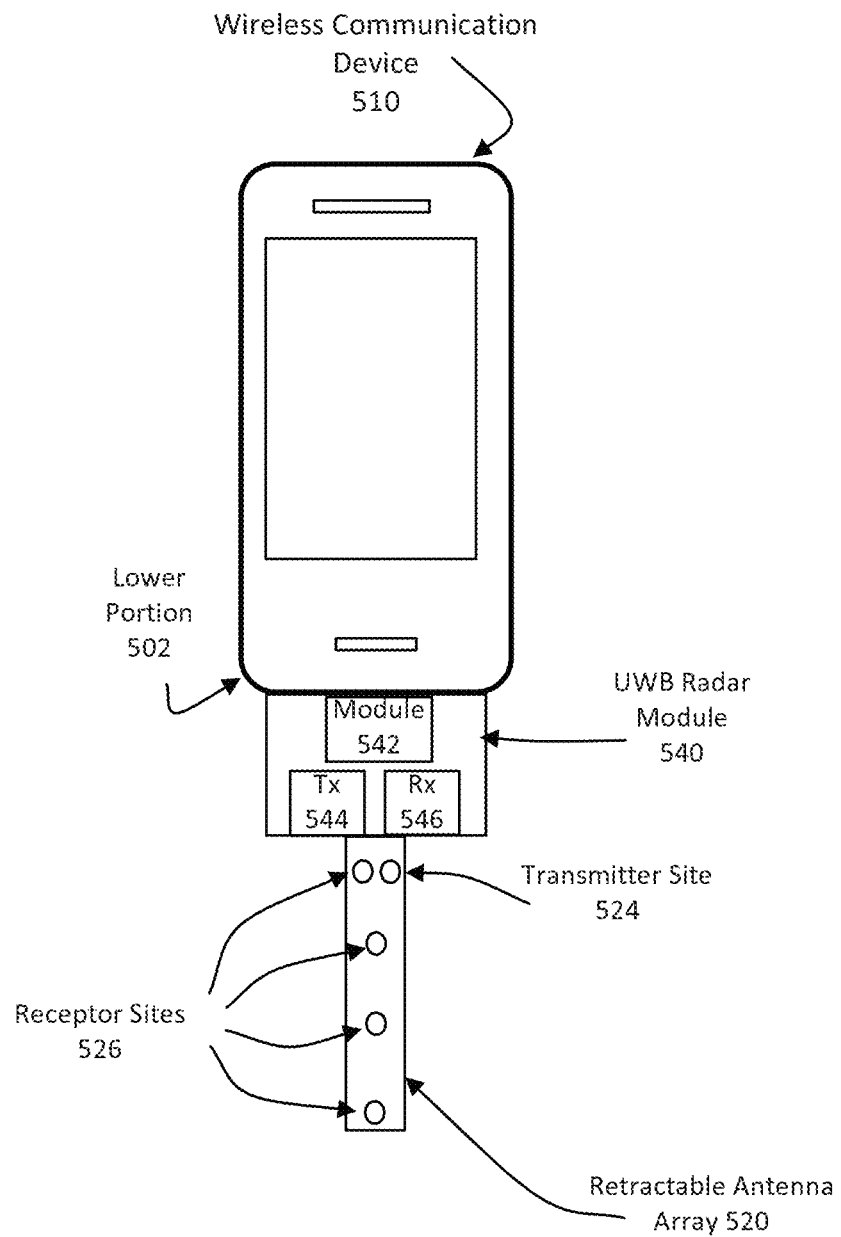
FIG. 5 illustrates an example wireless communication device coupling to an UWB radar system.

Although not shown in FIG. 5, additional transmitter site and/or receptor sites may also be located on various areas of wireless communication device 410 to allow for potentially greater spatial diversity. For example, receptor sites may be placed anywhere along the face (front view 405) of wireless communication device 410.

In some examples, phased array techniques that may include beam steering from transmitter site 424 may enable UWB radar system 140 to direct UWB pulses to particular areas of a vocal tract. Also, directional receptor sites 426 may be configured to directional receive reflected UWB pulses. Both of these techniques, for example, may allow for flexibility in locating transmitter and/or receptor sites that may depend less on spatially diversity to transmit and/or detect UWB pulses.

FIG. 5 illustrates an example wireless communication device 510 coupling to an UWB radar system 540. According to some examples, wireless communication device 510 may include at least some of the elements of computing platform 100. However, different than wireless communication device 410 described for FIG. 4, an external UWB radar system 540 may couple with a lower portion 502 of wireless communication device 510 as shown in FIG. 5. In some examples, similar to UWB radar system 140 for FIGS. 1 and 4, UWB radar system 540 includes a module 542, a transmitter (Tx) 544 and a receiver (Rx) 546 to generate, transmit and receive, respectively, UWB signals. Although not shown in FIG. 5, suggestion manager 120 may communicatively couple with UWB radar system 540 via a serial data bus (e.g., USB) or other type of interface that may couple UWB radar system 540 to computing platform 100.

According to some examples, as shown in FIG. 5, a retractable antenna array 520 having a transmitter site 524 and receptor sites 526A-D may couple to UWB radar system 540. For these examples, UWB pulses (e.g., generated by module 542) may be transmitted (e.g., via Tx 544) from transmitter site 524 toward vocal organs in a vocal tract (e.g., vocal tract 300). Also, for these examples, reflected UWB pulses may be captured or sensed at spatially diverse receptor site 526A-D (e.g., via Rx 146).

In some examples, the extension of retractable antenna array 520, for example, may position receptor sites 526A-D to better sense reflected UWB signals from one or more vocal organs of the user's vocal tract. Also, when sounded speech communication is desired, a user of wireless communication device 510 may collapse retractable antenna array 520 (e.g., via a telescopic mechanism) so that only a portion retractable antenna array 520 extends from UWB radar 540. Alternatively, a user may merely remove or decouple UWB radar system 540 from the lower portion of wireless communication device 510 when non-sounded speech communication is desired.

Figure 6:
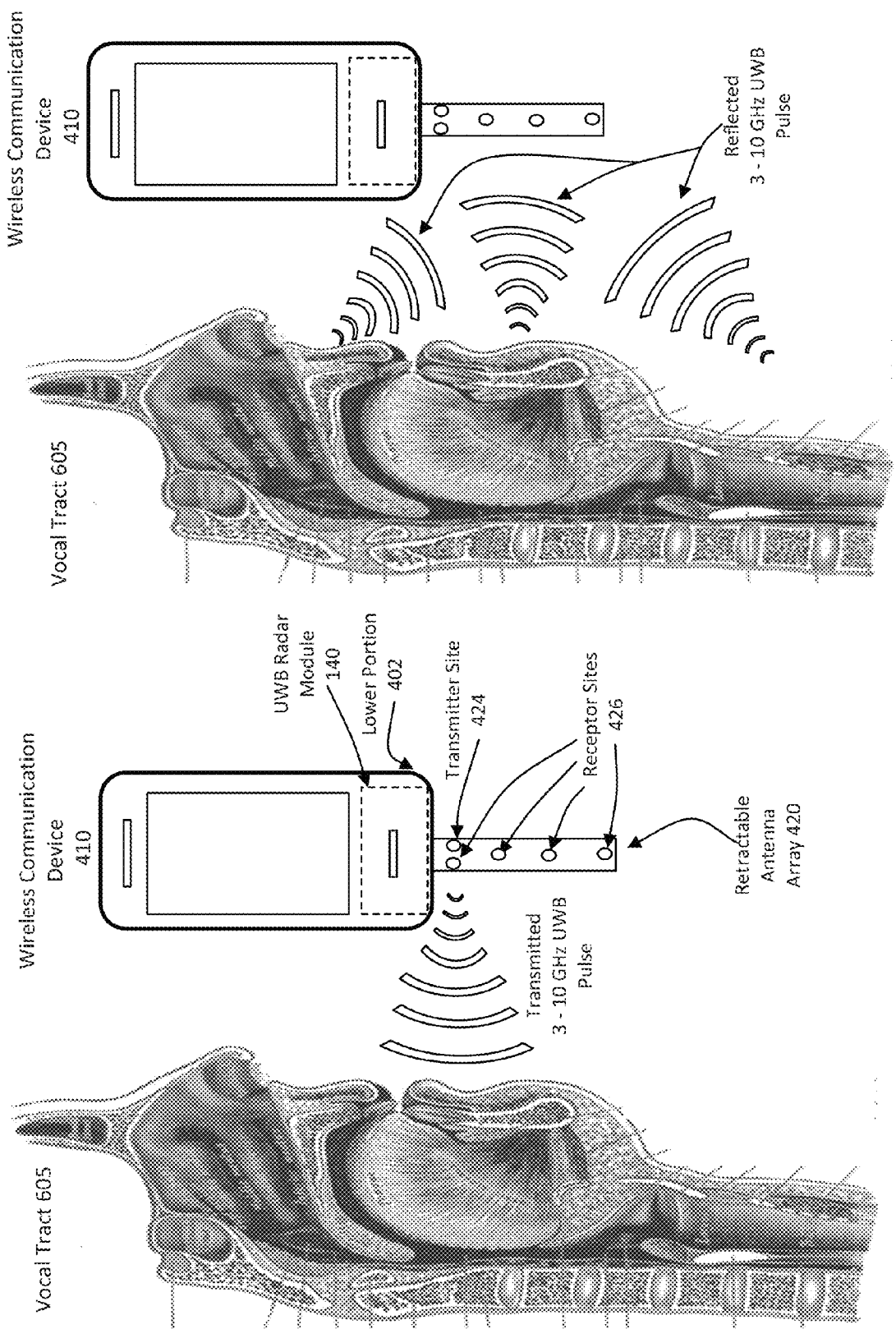
FIG. 6 illustrates an example diagram of UWB signals transmitted towards and reflected back from vocal organs for a vocal tract.

FIG. 6 illustrates an example diagram of UWB signals transmitted towards and reflected back from vocal organs for a vocal tract 605. In some examples, wireless communication device 410 as shown and describe above for FIG. 4 may be configured for non-sounded speech communication. For these examples, retractable antenna array 420 may be extended as shown in FIG. 6 such that receptor sites 426A-D are spatially diverse and configured to detected reflected UWB signals. Also, for these examples, a speaker having vocal tract 605 may hold wireless communication device 410 to the speaker's head while performing the non-sounded speech communication.

According to some examples, UWB radar system 140 may be configured to generate UWB pulses (e.g., via module 142) that fall within a range or band of UWB frequencies. For example, an UWB pulse having a frequency band of 3 GHz to 10 GHz may be an effective frequency band for modeling human vocal organs included in a vocal tract such as vocal tract 605. Although this disclosure is not limited to frequency bands that fall between 3 GHz to 10 GHz. Also, UWB radar system 140 may generate UWB frequencies having a power spectral density emission limit of −41 dBm per megahertz. In other words, the power spectral density emission may not exceed −41 decibels (dB) per milliwatt (mW) at a resolution of 1 megahertz.

In some examples, the power spectral density emission limit of −41 dBm per megahertz reduces and limits the amount of electromagnetic frequency energy a human body may be exposed to while organs of a vocal tract are being sensed using UWB radar system 140. For example, the power in watts associated with −41 dBm is approximately 0.1 microwatts or $1/10,000^{th}$ of a mW. Also, the low power spectral density may cause little or no interference with wireless communications from wireless communication device 410.

According to some example, as shown in FIG. 6, UWB radar module 140 may transmit an UWB pulse from transmitter site 424 towards vocal organs included in vocal tract 605. As depicted in FIG. 6 on the left side, a 3-10 GHz UWB pulse may be transmitted. Also, as shown on the right side of FIG. 6, more than one 3-10 GHz UWB pulse may be reflected back from the vocal organs included in vocal tract 605. For these examples, receptor sites 426A-D may be spatially diverse to detect the reflected signals. For example, the bony material associated with human teeth or areas of a human throat (e.g., pharynx or larynx) may have higher incidence angles that may reflect UWB signals towards receptor sites 426C or 426D. Meanwhile, muscle material associated with a human tongue may have a lower incidence angle that reflects UWB signals toward receptor sites 426A or 426B.

Although FIG. 6 shows a single UWB pulse transmitted towards vocal tract 605, this disclosure contemplates a large number of UWB pulses may be generated in a given second (e.g., several million pulses/second).

FIG. 7 illustrates an example voice model 700. In some examples, voice model 700 may be created based on a vocal tract of a speaker being sensed during sounded speech communication. For these examples, the speaker may be using wireless communication device 410. Speech manager 120, for example, may include logic and/or features configured to use UWB radar 140 to sense the vocal tract during the sounded speech communication. According to some examples, the speaker may perform one or more training sequences while the vocal tract is being sensed. The training sequences may include, but are not limited to, a series of vocal sounds (e.g., utterances), reading various different sentences or reciting individual letters of an alphabet.

In some examples, speech manager 120 may include logic and/or features to also build at least portions of voice model 700 without having the speaker perform training sequences. For these examples, all or at least portions of voice model 700 may built using synthetic means that may include the use of a predefined dictionary of utterances and associated vocal tract locations or orientations. Thus, using a voice model 700 built using synthetic means a voice for the speaker may be reproduced that may not sound like the speaker's actual voice.

According to some examples, as shown in FIG. 7, voice model 700 includes information associated with various vocal tract organs. For these examples, position information for sounds 1-$n$ (where n>3) are included for separate vocal tract organs. For example, position information for the tongue of the speaker may be maintained for sound 1 in field 745-1. The position information, for example, may include any type of indication (e.g., grid coordinates or velocity information) to show relative movement (e.g., compared to a rest state) of the various vocal tract organs while the speaker performs the training sequences.

In some examples, the position information may also include separate timing indicators. For these examples, the separate timing indicators may be associated with vocal tract organ positions for a given sound as the sound is being made by the speaker over a time interval or time frame. For example, the time interval for the speaker to create the given sound may be around 10 milliseconds (ms). Several separate time indicators (e.g., at 1 ms increments) may indicate the position of vocal tract organs as the speaker created the given sound over the 10 ms time interval.

In some examples, position and timing information for a given sound may be gathered and a voice for the speaker or a simulation of at least components of the speaker's voice associated with the given sound (e.g., from a predefined dictionary of utterances) may also be gathered and stored in a memory location. For example, memory address information to obtain the speaker's actual voice or a simulation of at least components of the speaker's voice may be included in voice model 700 at field 790-1 for sound 1. The memory address information, for example, may be associated with memory maintained at storage 190 of computing platform 100.

FIG. 8 illustrates an example vocal tract table 800. In some examples, vocal tract table 800 may be created based on a vocal tract of the speaker being sensed during non-sounded speech communication. For these examples, the speaker may be using wireless communication device 410. Speech manager 120, for example, may include logic and/or features configured to use UWB radar 140 to sense a vocal tract of the speaker to create vocal tract table 800. As shown in FIG. 8, vocal tract 800 may include position information for times 1-$n$ (where n>3).

In some examples, position information of the various vocal tract organs is captured or sensed over given time intervals (e.g., every 10 milliseconds (ms)). For these examples, the position information may also include separate sub-interval indicators (e.g., for each 1 ms) to indicate positions of vocal tract organs from the beginning to the end of the given time interval. For example, the speaker's tongue position information for time 1 may be included in field 845-1.

According to some examples, speech manager 120 may include logic and/or features to map information included in vocal tract table 800 to information included in voice model 700. As mentioned above, voice model 700 was created while the speaker conducted sounded speech communication or at least portions were synthetically generated. Thus, mapping the information obtained in vocal tract table 800 to information obtained in voice model 700 may enable speech manager 120 to simulate the vocal tract during sounded speech communication.

In some example, speech manager 120 may included logic and/or features that search for a closest match for the position information included in each of the given times in vocal tract table 800 to position information included for sounds 1-$n$ in voice model 700. Once a closest match is identified, speech manager 120 generates a simulation of the vocal tract during sounded speech communication by using the closest matched position information in voice model 700 as the simulated vocal tract. So, for example, position information at Time 1 included in vocal tract table 800 may be matched to position information included at Sound 3 in voice model 700. The position information for the various vocal tract organs now becomes the simulated vocal tract at time 1.

According to some examples, speech manager 120 may include logic and/or features to reproduce or generate at least components of a voice for the speaker based on the above-mentioned simulation of the vocal tract during sounded speech communication. For example, components (e.g., utterances) of the speaker's actual or components of a simulation of the speaker's voice maintained at the memory address associated with Sound 3 (included in field 790-1) may be retrieved by speech manager 120 to generate at least components of the voice for the speaker at time 1. Speech manager 120 may also carry out similar mapping, simulation and generating for the position information included in Times 2-$n$.

In some examples, speech manager 120 may go through the mapping, simulation and generating in order to enable the voice for the speaker to be reproduced in as close to real-time as possible (e.g., near real-time) via a vocoder (e.g., vocoder 143). For example, wireless communication device 410 may couple to another communication device. Enabling the vocoder to reproduce the voice for the speaker in near real-time may enable the speaker to use non-sounded communication and have wireless communication device 410 transmit a digitally reproduced voice with an imperceptible or a slight delay. The imperceptible or slight delay may enable the speaker to maintain a conversation with the other speaker without long delays or pauses.

Figure 9:
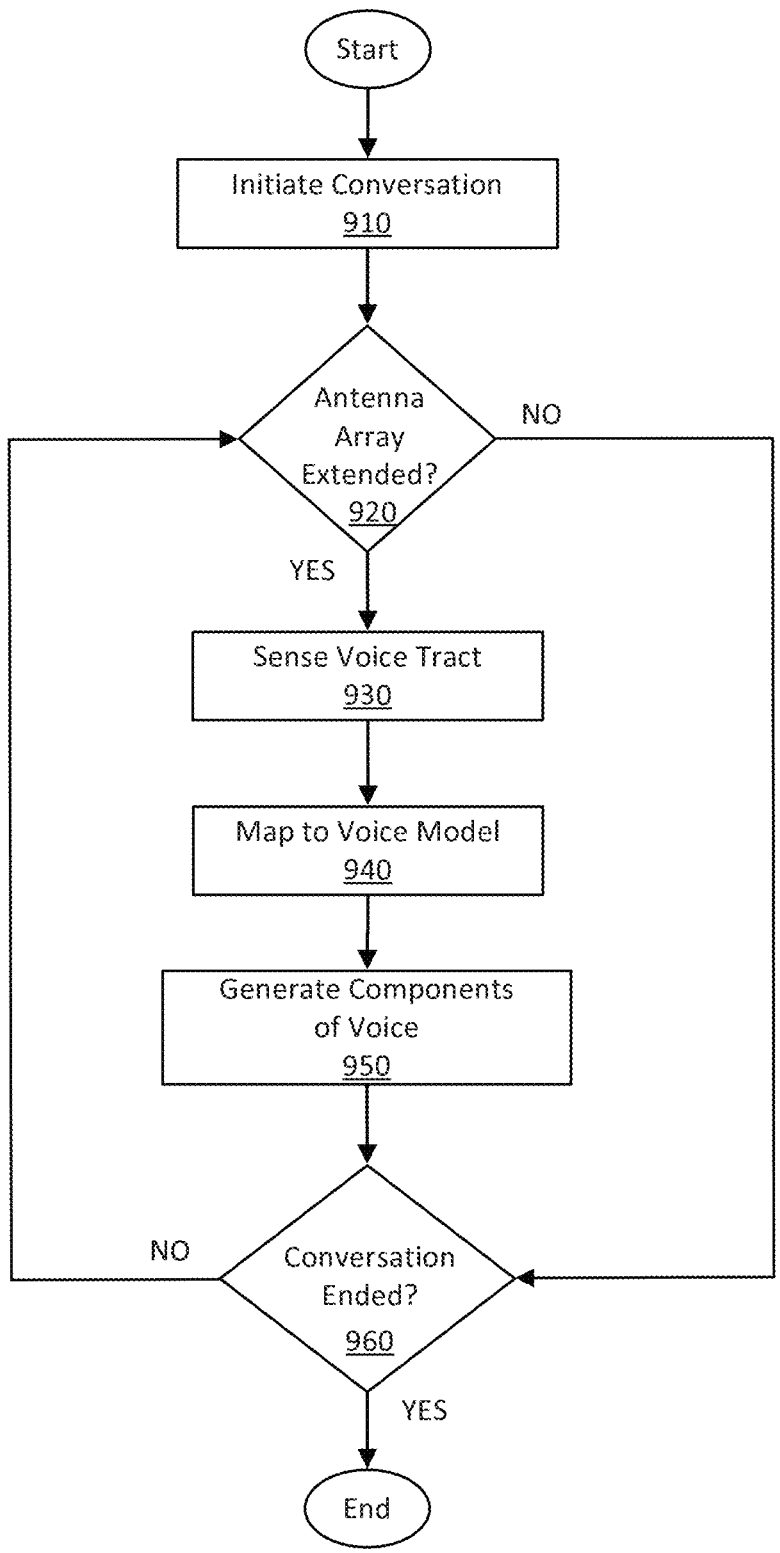
FIG. 9 illustrates a flow chart of example operations for reproducing a voice for a speaker based on vocal tract sensing using UWB radar.

FIG. 9 illustrates a flow chart of example operations for reproducing a voice for a speaker based on vocal tract sensing using UWB radar. In some examples, elements of computing platform 100 as shown in FIG. 1 may be used to illustrate example operations related to the flow chart depicted in FIG. 9. Suggestion manager 120 as shown in FIG. 1 and FIG. 2 may also be used to illustrate the example operations. Wireless communication devices 410 and 510 as shown in FIGS. 4-6 may also be used to illustrate the example operations. Also, logic and/or features of suggestion manager 120 may generate or build voice model 700 or vocal tract model 800 as shown in FIGS. 7-8. But the described methods are not limited to implementations on computing platform 100, speech manager 120, wireless communication devices 410 and 510 or to the models shown in FIGS. 7-8.

Moving from the start to block 910 (Initiate Conversation), a speaker using wireless communication device 410 may initiate a conversation with another speaker. In some examples, initiation of a conversation may include the speaker dialing the other speaker's phone number or answering an incoming call from the other speaker or may include any other ways a speaker may initiate a conversation (e.g., voice activation, body motion, gesturing, hot buttons, etc.).

Moving from block 910 to decision block 920 (Antenna Array Extended?), speech manager 120 may include logic and/or features configured to determine whether retractable antenna array 420 has been extended (e.g., via initiate feature 212) away from wireless communication device 410. In some examples, the speaker may extend retractable antenna array 420 based on intent to conduct non-sounded speech communication, e.g., mouth words with little to no sound emitted from the speaker's vocal track. If retractable antenna array 420 is extended, the process moves to block 930. Otherwise, the process moves to decision block 960.

Proceeding from decision block 920 to block 930 (Sense Voice Tract), speech manager 120 may include logic and/or features configured to gather sense information for a vocal tract of the speaker during substantially non-sounded speech communication (e.g., via table feature 214). In some examples, speech manager 120 may use UWB radar system 140 to sense the vocal tract. For these examples, speech manager 120 may cause UWB radar system 140 to generate UWB pulses (e.g., generated by module 142) and transmit the UWB pulses (e.g., via transmitter 144) from transmitter site 424 toward vocal organs in the vocal tract of the speaker. Also, for these examples, speech manager 120 may cause UWB radar system 140 to detect reflected UWB pulses at spatially diverse receptor site 426A-D (e.g., via receiver 146). Speech manager 120 may then gather the sensed information in order to build a vocal tract table in the format of vocal tract table 800 as described above.

Proceeding from block 930 to block 940 (Map to Voice Model), speech manager 120 may include logic and/or features configured to map the sensed vocal tract information in the format of vocal tract table 800 to a voice model in the format of voice model 700 (e.g., via simulate feature 216). In some examples, speech manager 120 may map the sensed vocal tract in order to generate a simulation of the vocal tract of the speaker during sounded speech communication. For these examples, speech manager 120 may search for a closest match between the sensed vocal tract information and the voice model to generate the simulation of the vocal tract during sounded speech communication.

Moving from block 940 to block 950 (Generate Components of Voice), speech manager 120 may include logic and/or features configured to generate at least components of a voice for the speaker based on the simulated vocal tract (e.g., via generate feature 218). In some examples, the generation of the components may enable the voice to be reproduced in near real-time via vocoder 143. For these examples, speech manager 120 may obtain various stored versions of components of actual or simulated speaker voices associated with the simulated vocal tract to generate at least components of the voice for the speaker. Generating at least components of the voice may then enable vocoder 143 to reproduce the voice for the speaker in near-real time. Near real-time reproduction of the voice for the speaker may allow the speaker to use non-sounded communication and have wireless communication device 410 transmit a reproduced voice to the other speaker with an imperceptible or a slight delay.

Proceeding from block 950 to decision block 960 (Conversation Ended?), speech manager 120 may include logic and/or features configured to determine whether the conversation has ended (e.g., via initiate feature 212). In some examples, speech manager 120 may determine that the conversation has ended based on a disconnection of the connection between wireless communication device 410 and the other communication device. If the conversation has ended, the process comes to an end. Otherwise, the process moves back to decision block 920.

Figure 10:
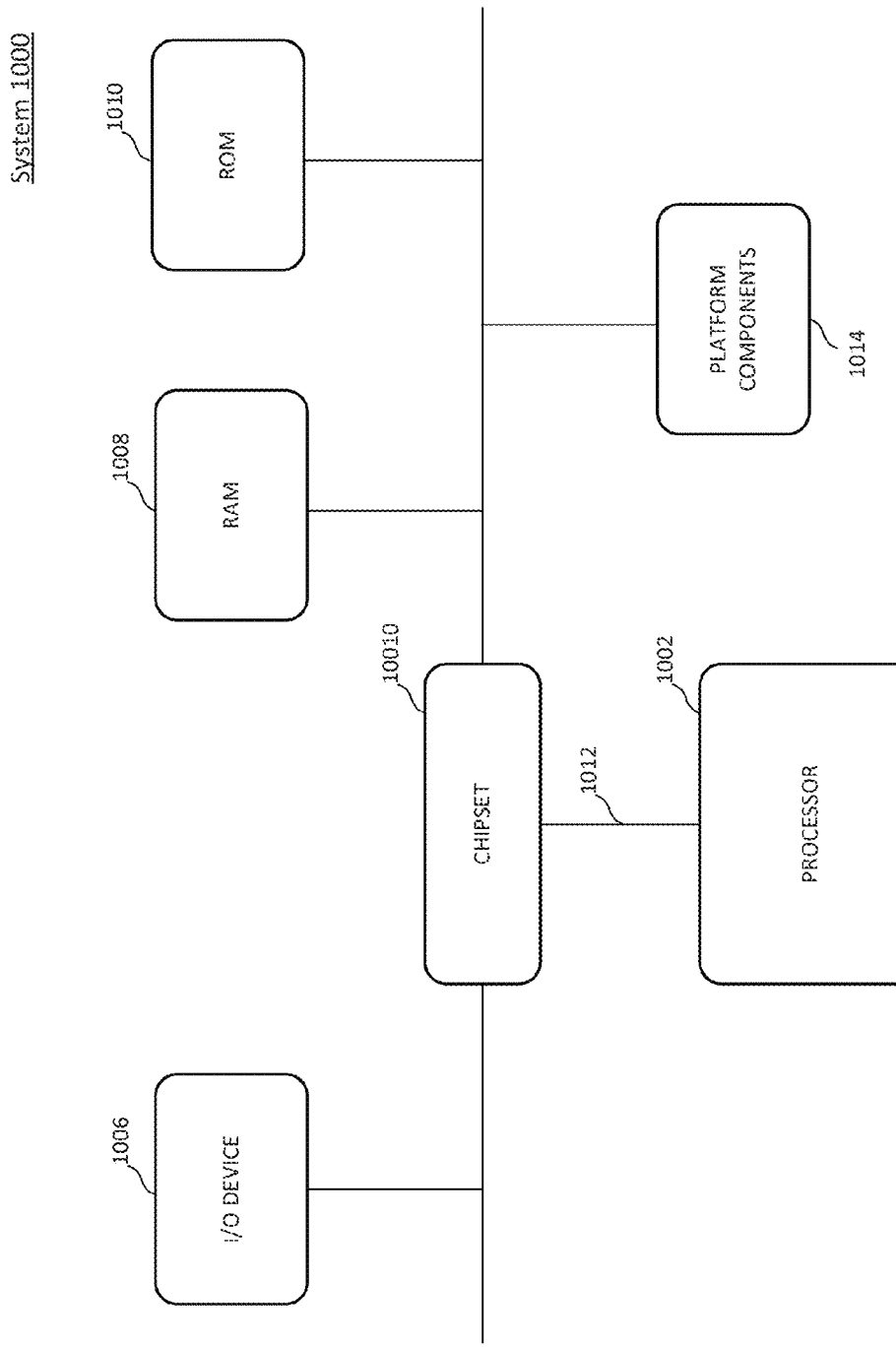
FIG. 10 illustrates an example system.

FIG. 10 is a diagram of an example system 1000 for a computing device. In particular, FIG. 10 is a diagram showing a system 1000, which may include various elements. For instance, FIG. 10 shows that system 1000 may include a processor 1002, a chipset 1004, an input/output (I/O) device 1006, a random access memory (RAM) (such as dynamic RAM (DRAM)) 1008, and a read only memory (ROM) 1010, and various platform components 1014 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines. In various examples, chipset 1004 may be integrated or packaged with processor 1002. Other examples are described and claimed.

Processor 1002 may be a central processing unit including one or more processor cores and may have any number of processors including any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth.

Although not shown, the system 1000 may include various interface circuits, such as an Ethernet interface and/or a Universal Serial Bus (USB) interface, and/or the like. In some exemplary embodiments, the I/O device 1006 may include one or more input devices connected to interface circuits for entering data and commands into the system 1000. For example, the input devices may include a keyboard, mouse, touch screen, track pad, track ball, isopoint, a voice recognition system, and/or the like. Similarly, the I/O device 1006 may include one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 1000 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Various examples may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture. An article of manufacture may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

According to some examples, an article of manufacture may include a non-transitory storage medium to store or maintain instructions that when executed by a computer or system, cause the computer or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a computer to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    sensing a vocal tract of a speaker during non-sounded speech communication using an ultra wide band (UWB) radar system coupled to a wireless communication device;
    mapping information associated with the sensed vocal tract to a voice model to generate a simulation of the vocal tract during sounded speech communication; and
    generating at least components of a voice for the speaker based on the simulation to enable the voice for the speaker to be reproduced in real-time via a voice encoder (vocoder).

2. The method of claim 1, comprising sensing the vocal tract of the speaker to include:
    causing the UWB radar system to transmit UWB signals toward vocal organs for the vocal tract of the speaker and also causing the UWB radar system to detect reflected UWB signals at spatially diverse receptor sites, each spatially diverse receptor site to be associated with UWB signals reflected from at least one vocal organ; and
    determining physical orientations of the vocal organs based on the detected reflected UWB signals.

3. The method of claim 2, comprising causing the UWB radar system to pulse transmission of the UWB signals via a bandwidth comprised within a frequency band spanning from 3 gigahertz to 10 gigahertz.

4. The method of claim 3, the UWB signals having a power spectral density emission limit of −41 decibels per milliwatt at a resolution of 1 megahertz.

5. The method of claim 2, comprising the vocal organs to include one or more of lips, teeth, tongue, velum, uvula, pharynx, epiglottis, larynx, glottis, vocal folds or nasal cavity.

6. The method of claim 2, comprising causing the UWB radar system to detect reflected UWB signals at spatially diverse receptor sites responsive to extending an antenna array from the wireless communication device, the antenna array to include at least some of the spatially diverse receptor sites.

7. The method of claim 1, comprising sensing the vocal tract of the speaker to include:
    causing the UWB radar system to transmit UWB signals toward vocal organs for the vocal tract of the speaker via two or more spatially diverse transmitter sites and also causing the UWB radar system to detect reflected UWB signals at two or more spatially diverse receptor sites, each spatially diverse receptor site to be associated with UWB signals reflected from at least one vocal organ; and
    determining physical orientations of the vocal organs based on the detected reflected UWB signals.

8. The method of claim 1, comprising the voice model being created based at least on one or more training sequences performed by the speaker during sounded speech communication, the vocal tract of the speaker being sensed using the UWB radar system during the one or more training sequences to create at least part of the voice model.

9. The method of claim 1, comprising communicatively coupling with another communication device and reproducing the voice for the speaker in real-time also includes enabling the speaker to maintain a conversation with another speaker using the other communication device.

10. The method of claim 9, comprising the vocoder being located at the other communication device, the generated components of the voice being transmitted to the other communication device from the wireless communication device to enable the voice for the speaker to be reproduced in real-time via the vocoder at the other communication device.

11. The method of claim 1, comprising the vocoder being located with the wireless communication device.

12. An apparatus comprising:
    a processor circuit; and
    a memory unit communicatively coupled to the processor circuit, the memory unit arranged to store a speech manager operative on the processor circuit to sense a vocal tract of a speaker during non-sounded speech communication using an ultra wide band (UWB) radar system coupled to a wireless communication device and map the information associated with the sensed vocal tract to a voice model to generate a simulation of the vocal tract during sounded speech communication, the speech manager also operative to generate at least components of a voice for the speaker based on the simulation to enable the voice for the speaker to be reproduced in real-time via a device voice encoder (vocoder).

13. The apparatus of claim 12, comprising a retractable antenna array attached with a lower portion of the wireless communication device, the speech manager configured to initiate the modeling of the vocal tract responsive to an extension of the retractable antenna array from the wireless communication device.

14. The apparatus of claim 13, comprising to sense the vocal tract includes the speech manager configured to:
cause the UWB radar system to transmit UWB signals toward vocal organs for the vocal tract of the speaker;
cause the UWB radar system to detect reflected UWB signals at spatially diverse receptor sites located on the extended retractable antenna array, each spatially diverse receptor site to be associated with UWB signals reflected from at least one vocal organ; and
determine physical orientations of the vocal organs based on the detected reflected UWB signals.

15. The apparatus of claim 14, comprising the speech manager to cause the UWB radar system to pulse transmission of the UWB signals via a bandwidth comprised within a frequency band spanning from 3 gigahertz to 10 gigahertz.

16. The apparatus of claim 14, comprising the vocal organs to include one or more of lips, teeth, tongue, velum, uvula, pharynx, epiglottis, larynx, glottis, vocal folds or nasal cavity.

17. The apparatus of claim 12, comprising the speech manager configured to create the voice model based at least on one or more training sequences performed by the speaker during sounded speech communication, the vocal tract of the speaker being sensed by the speech manager using the UWB radar system during the one or more training sequences to create at least part of the voice model.

18. The apparatus of claim 1, comprising the vocoder being located with the wireless communication device.

19. An article of manufacture comprising a non-transitory computer-readable storage medium containing instructions that when executed cause a system to:
sense a vocal tract of a first speaker during non-sounded speech communication using an ultra wide band (UWB) radar system coupled to a wireless communication device;
map information associated with the sensed vocal tract to a voice model to generate a simulation of the vocal tract during sounded speech communication; and
generate at least components of a voice for the first speaker based on the simulation to enable the voice for the speaker to be reproduced in real-time via a device voice encoder (vocoder) and also to enable the first speaker to maintain a conversation with a second speaker that is using another communication device.

20. The article of manufacture of claim 19, comprising the vocoder being located at the other communication device, the instructions to cause the system to transmit the reproduced components of the voice to the other communication device from the wireless communication device to enable the voice for the speaker to be reproduced in real-time via the vocoder at the other communication device.

21. The article of manufacture of claim 19, comprising the instructions to cause the system to initiate the sensing of the vocal tract responsive to an extension of a retractable antenna array from the wireless communication device.

22. The article of manufacture of claim 21, comprising the instructions to cause the system to sense the vocal tract associated with the first speaker includes the instructions to cause the system to:
cause the UWB radar system to transmit UWB signals toward vocal organs for the vocal tract of the first speaker;
cause the UWB to detect reflected UWB signals at spatially diverse receptor sites located on the extended retractable antenna array, each spatially diverse receptor site to be associated with UWB signals reflected from at least one vocal organ; and
determine physical orientations of the vocal organs based on the detected reflected UWB signals.

23. The article of manufacture of claim 22, comprising the instructions to cause the system to cause the UWB radar system to pulse transmission of the UWB signals via a bandwidth comprised within a frequency band spanning from 3 gigahertz to 10 gigahertz.

24. The article of manufacture of claim 22, comprising the vocal organs to include one or more of lips, teeth, tongue, velum, uvula, pharynx, epiglottis, larynx, glottis, vocal folds or nasal cavity.

25. The article of manufacture of claim 19, comprising the instruction to cause the system to create the voice model based at least on one or more training sequences performed by the first speaker during sounded speech communication, the vocal tract of the first speaker being sensed by using the UWB radar system during the one or more training sequences to create at least part of the voice model.

* * * * *